Patented July 16, 1935

2,007,968

UNITED STATES PATENT OFFICE 2,007,968

PROCESS OF ESTERIFICATION

George De Witt Graves, Wilmington, Del., assignor to E. I. du Pont de Nemours & Company, Wilmington, Del., a corporation of Delaware No Drawing. Application August 4, 1933, Serial No. 683,629

10 Claims. (Cl. 260—106)

This invention relates to a process of esterification and, more particularly, relates to the esterification of certain hydroxyl compounds by means of ketene.

It is well known that the compound ketene $CH_2=C=O$, more properly known as carbomethene, will react under some conditions with certain hydroxyl compounds to give an ester containing the acetyl radical. As shown in United States Patent 1,604,471 to D. A. Nightingale and United States Patent 1,685,220 to E. E. Middleton, this reaction has been used for the production of cellulose esters in the presence of a catalyst. It is further known that other hydroxyl compounds will react with ketene to give esters, although such reactions in the presence of an acid catalyst have not been carried out, to applicant's knowledge. The uncatalyzed reactions have been extremely slow as a rule, in some cases so slow that apparently it was erroneously assumed that no reaction at all took place. The speed of these uncatalyzed reactions decreases as one proceeds from primary to secondary to tertiary alcohols to phenols.

Ketene is commonly produced by the pyrolysis of acetone, a process which gives a gaseous mixture containing ketene, methane, and small amounts of carbon monoxide, ethylene, and other gases. Ketene cannot readily be prepared in the pure state. It is therefore commonly utilized by passing the gaseous mixture through the material to be treated, either in the pure state or dissolved or suspended in a suitable inert medium. Obviously the speed and efficiency with which ketene will be absorbed from the gaseous mixture depends upon the reactivity of the compound being treated. Rapid and complete absorption of ketene makes for simplicity of absorption equipment and for high yields based on the ketene itself. If the acetylation is slow, it must be carried out in successive stages, or the ketene not utilized in the primary reaction must be absorbed in some more reactive liquid such as acetic acid, whereby acetic anhydride would be produced as a byproduct.

An object of the present invention is to provide a process whereby the esterification of monohydroxyl compounds, glycerol, glycol, and derivatives of glycerol and glycol containing at least one hydroxyl group can be expeditiously esterified by ketene. A further object is to provide a process whereby the esterification can be carried out with rapid and complete absorption of the ketene. Other objects of the invention will be apparent from the description given hereinafter.

The above objects are accomplished according to the present invention by esterifying a compound from the group consisting of monohydroxyl compounds, glycerol, glycol, and derivatives of glycerol and glycol containing at least one hydroxyl group, by contacting same with ketene in the presence of catalytic amounts of a strong acid.

It has been found that such esterification catalysts as sulfuric acid, para-toluenesulfonic acid, and the like, greatly accelerate the rate of acetylation of certain hydroxyl compounds with ketene. These two catalysts are particularly efficient in the present process, but other strong acids, such as chlorosulfonic acid, benzenesulfonic acid, hydrogen chloride, perchloric acid, phosphoric acids, and the like, may also be employed to good advantage in the present process. It is very desirable for the success of the process that the hydroxyl compound chosen be a liquid at room temperature or readily liquefiable (melting for example below 50° C.) in order to promote uniform and intimate contact between the catalyst, the ketene, and the hydroxyl compound. Some degree of acetylation can however be obtained by dissolving (not suspending) the hydroxyl compound, if high melting, in an anhydrous solvent which is non-reactive to ketene, e. g. acetone.

The following examples are given to illustrate specific embodiments of the present invention. In these examples the ketene used was in the ordinary mixture of gases obtained by cracking acetone to produce ketene, the ketene amounting to about 25–50% of the gas mixture by weight. Gaseous mixtures containing different amounts of ketene can of course be used.

*Example 1.*—Ketene gas was passed at the rate of 2 grams per minute through 47 grams of melted phenol for three hours. The phenol was 50% acetylated. A similar run made in the presence of one gram of concentrated sulfuric acid resulted in the acetylation of phenol to the extent of 92–93% in 1.5 hours.

*Example 2.*—"Laurol" is a mixtur  of primary aliphatic alcohols made by hydrogenating cocoanut oil acids. Ketene gas was passed at the rate of 2 grams per minute through 92 grams of "Laurol" (approximately 0.5 mol). The temperature rose from 68° to 83° C. in 14 minutes and to 85° C. in a total of 18 minutes. During this time the "Laurol" gained 8 grams in weight.

A similar run was made in the presence of 1% of para-toluenesulfonic acid, 93 grams of "Laurol" gaining 14 grams in 18 minutes. The temperature rose from 68° to 83° C. in 4.5 minutes, where it was held for the remainder of the period by means of a water bath.

A third similar run was made in the presence of 1% of concentrated sulfuric acid, 93 grams of "Laurol" gaining 19 grams in 18 minutes. The temperature rose from 68° to 83° C. in three minutes, where it was held for the remainder of the period.

These three similar runs show clearly the effect of the two catalysts on the rate of acetylation of "Laurol".

Example 3.—Ketene gas was passed at the rate of 2 grams per minute through 166 grams of C. P. glycerol for 7.5 hours. The saponification number of the product was only 177.5, whereas the calculated values for the monoacetate and diacetate are 415 and 694, respectively.

In a similar run, 31 grams of glycerol, plus 10 drops of concentrated sulfuric acid, were treated with ketene gas for one hour. The saponification number of the product indicated 93% conversion to diacetate.

Example 4.—Ethyl ricinoleate (0.1 mol) was treated with ketene gas at the rate of 2 grams per minute for 8 minutes. The temperature rose from 72° to 89° C. The gain in weight was 2.7 grams.

In a similar run, in the presence of 1% of concentrated sulfuric acid, 0.1 mol of ethyl ricinoleate absorbed 4.5 grams of ketene in 8 minutes. The temperature rose from 72° to 89° C. in two minutes. It was held below 93° C. for the remainder of the period by means of a water bath.

It is to be understood that the above examples are merely illustrative, as the invention includes within its scope the acetylation of monohydroxyl compounds, glycerol, glycol, and derivatives of glycerol and glycol containing at least one hydroxyl group, by means of ketene in the presence of catalytic amounts of a strong acid. By the term "strong acid" as used in the claims is intended to be included the various acids disclosed, and equivalents thereof. While it is not desired to be confined to theory, it is believed that the principle of the present discovery lies in the intermediate formation of mixed anhydrides between the ketene and the strong acid catalyst, especially inorganic acids; this could not occur with a basic catalyst. This mixed anhydride is highly reactive towards those monohydroxyl compounds, such as phenols and aliphatic alcohols, which past efforts to acetylate with ketene in the absence of a catalyst have been mostly unsuccessful. In the subsequent esterification with the mixed anhydride, the acetyl portion of the anhydride reacts to form the acetate and the strong inorganic acid is regenerated for the formation of more mixed anhydride. For this reaction to proceed smoothly, and for the proper distribution of the catalyst throughout the compound to be acetylated, it is necessary to have that intimate contact which is obtainable only with liquid or readily liquefiable bodies; starches, carbohydrates, and celluloses do not fit these requirements, nor indeed is this same intimate contact obtained by suspending them in an inert medium. Certain higher-melting phenols and alcohols, e. g., diphenylolpropane, hydroxydiphenyls, resorcinol, pentaerythritol, etc. can be employed with some success by dissolving them in an inert solvent medium such as acetone, hydrocarbons, etc. This variation of the process cannot be applied to starches, celluloses and the like, since they are insoluble.

Other monohydroxyl compounds particularly suitable to be acetylated according to the present process include the monohydric aliphatic alcohols, hydroxy acids, hydroxy aldehydes, hydroxy esters, and hydroxy ketones; monohydric aromatic alcohols, and the ether-alcohols of glycerol and glycol, such as mono- and di-ethylin, mono- and di-methylin, methoxy- and ethoxyethyl alcohol, and the like. Acetylations of other liquefiable hydroxyl compounds are also accelerated by strong catalysts, but less so than the above; among the types of compounds where the use of strong catalysts is less efficacious, but nevertheless definite are polyhydric phenols, phenol alcohols, polyhydric alcohols other than glycerol and the glycols, and aliphatic ketones, aldehydes, acids, etc., substituted by more than one hydroxyl group. Specific examples of the better types of monohydroxy compounds, which may be used alone or mixed, are: Methyl, butyl, lauryl, stearyl, crotyl, oleyl, geranyl, benzyl, xylenyl, cinnamyl, salicyl, cyclohexyl, menthyl, fenchyl, and tetrahydrofurfuryl alcohols; ethylene glycol, butylene glycol, diethylene glycol, glycerol and polyglycols and polyglycerols; mono- and di-alkyl, aryl and aralkyl ethers of glycerol, as the monobenzyl, monophenyl, and diethyl ethers; monohydric ether-alcohols such as ethoxyethyl, butoxyethyl, phenoxyethyl, p-methoxybenzyl, etc.; phenols such as phenol, the cresols, the xylenols, resorcinol mono methyl ether, thymol, eugenol, diphenylolpropane (in acetone solution); and miscellaneous types such as ethylene glycol mono-acetate, linoleate and stearate; partial esters of glycerol with fatty oil acids, as linseed and chinawood oil acids, ethyl ricinoleate; monoethylin monolaurate; methoxyethyl lactate; acetyl carbinol; diacetone alcohol; keto-butanol; aldol; lactic acid, hydracrylic acid, ricinoleic acid, malic acid. These are all C—OH compounds.

While the preferred embodiment of the invention deals with acetylations with carbo-methene, ketenes generally may be used. Among others which are suitable are:

| Common name | Formula |
| --- | --- |
| Methyl ketene | $CH_3CH=C=O$ |
| Ethyl ketene | $C_2H_5CH=C=O$ |
| Dimethyl ketene | $(CH_3)_2C=C=O$ |
| Diphenyl ketene | $(C_6H_5)_2C=C=O$ |
| Diphenylene ketene | $(C_6H_4)_2C=C=O$ |

Suitable ketenes have the general formula

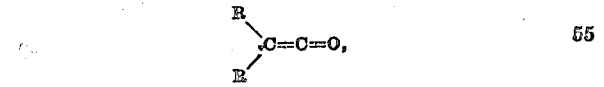

where R is hydrogen or a hydrocarbon radical. However, the general instability and erratic behavior of the substituted ketenes renders their use a definitely less preferred embodiment of the invention.

Of the catalysts disclosed, sulfuric acid and para-toluenesulfonic acid are particularly efficacious in accelerating acetylation. However, the reaction may also be accelerated by other strong acids such as disclosed above. As is general in the use of catalysts, the amount required is exceedingly small, although larger amounts may be present without causing any harmful effect. It is preferred that the catalyst should amount to from 0.5% to 2.0% by weight of the hydroxyl compound being treated, although quantities outside this range are by no means precluded.

According to the process herein described, various hydroxyl compounds may be acetylated by means of ketene gas at a greatly accelerated rate, thereby permitting the utilization of ketene with simpler and less expensive absorption equipment. Furthermore, by so greatly increasing the rate of reaction the present invention enables ketene to be used in a practical manner in many reactions which heretofore had never been considered more than experimental curiosities.

While the present invention has been described with particular reference to the acetylation of certain hydroxyl compounds by means of ketene in the usual mixture of gases obtained by the pyrolysis of acetone, it will be understood by those skilled in the art that the present invention is applicable to acetylation of these hydroxyl compounds with ketene gas either in the pure state or in admixture with a wide variety of other gases, particularly inert ones, such as nitrogen, methane hydrocarbons, carbon dioxide, unchanged acetone, etc.

As many apparently widely different embodiments of this invention may be made without departing from the spirit and scope thereof, it is to be understood that the invention is not limited to the specific embodiments thereof except as defined in the appended claims.

I claim:

1. Process comprising esterifying a compound from the group consisting of monohydric C—OH compounds, glycerol, glycol, and derivatives of glycerol and glycol containing at least one hydroxyl group by contacting same with a ketene in the presence of catalytic amounts of a strong acid.

2. Process comprising esterifying a compound from the group consisting of monohydric C—OH compounds, glycerol, glycol, and derivatives of glycerol and glycol containing at least one hydroxyl group, by contacting same with a ketene in the presence of catalytic amounts of a catalyst from the group consisting of sulfuric acid and para-toluenesulfonic acid.

3. Process comprising esterifying a compound from the group consisting of monohydric C—OH compounds, glycerol, glycol, and derivatives of glycerol and glycol containing at least one hydroxyl group, by contacting same with a ketene in the presence of from 0.5% to 2.0% by weight of concentrated sulfuric acid.

4. Process comprising acetylating a compound from the group consisting of monohydric C—OH compounds, glycerol, glycol, and derivatives of glycerol and glycol containing at least one hydroxyl group, by passing a gaseous mixture containing carbo-methene into said compound in the presence of a catalytic amount of a strong acid.

5. Process comprising acetylating a compound from the group consisting of monohydric C—OH compounds, glycerol, glycol, and derivatives of glycerol and glycol containing at least one hydroxyl group, by passing a gaseous mixture containing carbo-methene into said compound in the presence of catalytic amounts of a catalyst from the group consisting of sulfuric acid and para-toluene sulfonic acid.

6. Process comprising acetylating a compound from the group consisting of monohydric C—OH compounds, glycerol, glycol, and derivatives of glycerol and glycol containing at least one hydroxyl group, by passing a gaseous mixture containing carbo-methene into said compound in the presence of from 0.5% to 2.0% by weight concentrated sulfuric acid.

7. A process for acetylating a liquefiable hydroxyl compound wherein the hydroxyl radical is directly attached to carbon which comprises passing a gaseous mixture containing carbo-methene into said compound in the presence of a catalytic amount of a strong acid.

8. A process for acetylating a liquefiable hydroxyl compound wherein the hydroxyl radical is directly attached to carbon which comprises passing a gaseous mixture containing carbo-methene into said compound in the presence of a catalytic amount of a strong inorganic acid which promotes said acetylation by the intermediate formation of a mixed anhydride and subsequent decomposition thereof.

9. A process for acetylating a liquefiable hydroxyl compound wherein the hydroxyl radical is directly attached to carbon which comprises passing a gaseous mixture containing carbo-methene into said compound in the presence of catalytic amounts of a strong acid and of a solvent for the hydroxyl compound, said solvent being non-reactive toward carbo-methene.

10. A process for acetylating a hydroxyl compound wherein the hydroxyl radical is directly attached to carbon which is a liquid below 50° C. which comprises passing a gaseous mixture containing carbo-methene into said compound in the presence of a strong acid catalyst.

GEORGE DE WITT GRAVES.